(12) United States Patent
Sakurai et al.

(10) Patent No.: US 11,511,370 B2
(45) Date of Patent: Nov. 29, 2022

(54) LASER WELDING METHOD

(71) Applicant: Panasonic Intellectual Property Management Co., Ltd., Osaka (JP)

(72) Inventors: Michio Sakurai, Osaka (JP); Toshiyuki Mishima, Osaka (JP); Toru Sakai, Hyogo (JP); Kenta Kubota, Osaka (JP); Kensuke Urata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 17 days.

(21) Appl. No.: 17/066,823

(22) Filed: Oct. 9, 2020

(65) Prior Publication Data

US 2021/0023651 A1 Jan. 28, 2021

Related U.S. Application Data

(63) Continuation of application No. PCT/JP2019/011463, filed on Mar. 19, 2019.

(30) Foreign Application Priority Data

Apr. 13, 2018 (JP) .............................. JP2018-077697

(51) Int. Cl.
*B23K 26/03* (2006.01)
*B23K 26/04* (2014.01)
(Continued)

(52) U.S. Cl.
CPC .......... *B23K 26/032* (2013.01); *B23K 26/042* (2015.10); *B23K 26/043* (2013.01);
(Continued)

(58) Field of Classification Search
CPC ............... B23K 26/032; B23K 26/034; B23K 26/0608; B23K 26/04; B23K 26/042;
(Continued)

(56) References Cited

U.S. PATENT DOCUMENTS 5,155,329 A 10/1992 Terada et al.
5,265,014 A * 11/1993 Haddock ............... G06F 40/253
704/9
(Continued)

FOREIGN PATENT DOCUMENTS

EP 2972479 B1 † 9/2020
JP 3-207587 9/1991
(Continued)

OTHER PUBLICATIONS

Machine English Translation of WO-2017042116-A1 (Year: 2017).*
(Continued)

*Primary Examiner* — Sang Y Paik
*Assistant Examiner* — Erwin J Wunderlich
(74) *Attorney, Agent, or Firm* — Wenderoth, Lind & Ponack, L.L.P.

(57) ABSTRACT

A plurality of values measured are relatively compared to determine an optical axis deviation direction in which an optical axis of a measurement beam S deviates from a laser beam L. In performing laser welding in the optical axis deviation direction, an irradiation position of the measurement beam S is changed so that the irradiation position of the measurement beam S is moved to a rear side of the center of the optical axis of the laser beam L in the welding direction.

5 Claims, 10 Drawing Sheets

(51) Int. Cl.
  *B23K 26/06* (2014.01)
  *B23K 26/042* (2014.01)
  *B23K 26/044* (2014.01)
  *G01B 11/02* (2006.01)

(52) U.S. Cl.
  CPC .......... *B23K 26/044* (2015.10); *B23K 26/048* (2013.01); *B23K 26/0608* (2013.01); *G01B 11/02* (2013.01)

(58) Field of Classification Search
  CPC .. B23K 26/043; B23K 26/044; B23K 26/048; G05B 2219/450138; G01B 11/02
  USPC .................................................... 219/121.63
  See application file for complete search history.

(56) References Cited

U.S. PATENT DOCUMENTS

| | | | |
|---|---|---|---|
| 6,326,589 B1 | 12/2001 | Beersiek et al. | |
| 6,424,412 B1* | 7/2002 | Matthews | G02B 27/0101 |
| | | | 348/E9.026 |
| 10,578,428 B2 † | 3/2020 | Strebel | |
| 2005/0169346 A1* | 8/2005 | Murray, Jr. | B29C 66/8748 |
| | | | 374/121 |
| 2012/0285936 A1 | 11/2012 | Urashima et al. | |
| 2015/0352666 A1 | 12/2015 | Fujita et al. | |
| 2016/0039045 A1* | 2/2016 | Webster | B23K 15/0046 |
| | | | 356/496 |
| 2016/0202045 A1* | 7/2016 | Schonleber | B23K 26/03 |
| | | | 356/497 |
| 2016/0356595 A1 | 12/2016 | Lessmueller et al. | |
| 2017/0326669 A1 | 11/2017 | Moser et al. | |
| 2019/0041196 A1* | 2/2019 | Strebel | B23K 26/032 |
| 2020/0361038 A1* | 11/2020 | Takechi | B23K 26/21 |
| 2021/0031298 A1* | 2/2021 | Sakai | B23K 26/043 |

FOREIGN PATENT DOCUMENTS

| | | | |
|---|---|---|---|
| JP | 2001-517554 | 10/2001 | |
| JP | 2003-170282 | 6/2003 | |
| JP | 2012-236196 | 12/2012 | |
| JP | 2018-501964 | 1/2018 | |
| WO | 2014/132503 | 9/2014 | |
| WO | WO-2017042116 A1 * | 3/2017 | ........... B23K 31/125 |

OTHER PUBLICATIONS

Extended European Search Report dated Jun. 7, 2021 in European Patent Application No. 19784215.6.
International Search Report dated Jun. 18, 2019 in International (PCT) Application No. PCT/JP2019/011463 with English translation.
Office Action dated Apr. 5, 2022 in corresponding Indian Patent Application No. 202047048819, 5 pages.
Search Report dated May 6, 2022 in corresponding Chinese Patent Application No. 201980025353.8, 1 page.

\* cited by examiner
† cited by third party

LASER WELDING METHOD

CROSS-REFERENCE TO RELATED APPLICATIONS

This is a continuation of International Application No. PCT/JP2019/011463 filed on Mar. 19, 2019, which claims priority to Japanese Patent Application No. 2018-077697 filed on Apr. 13, 2018. The entire disclosures of these applications are incorporated by reference herein.

BACKGROUND

The present invention relates to a laser welding method.

Laser welding devices are known that evaluate the quality of weld portions by directly measuring the depth of penetration of the weld portions (see Japanese Unexamined Patent Publication No. 2012-236196, for example).

The laser welding device disclosed in Japanese Unexamined Patent Publication No. 2012-236196 is configured to coaxially align a laser beam with a measurement beam and emit the coaxially aligned beams into a keyhole of a weld portion. The measurement beam is reflected from the bottom of the keyhole and received by an optical interferometer via a beam splitter. Since the optical interferometer can measure the optical path length of the measurement beam, the depth of the keyhole is detected from the measured optical path length and determined to be the depth of penetration of the weld portion.

SUMMARY

However, for example, the beam splitter may be warped due to the heat, thus causing misalignment of optical axes of the laser beam and the measurement beam. In such a case, there is a concern that the depth of the keyhole may not be accurately specified.

Specifically, the cross section of the bottom of the keyhole has a curved shape, where the penetration is shallow, on a fore side portion in the welding direction. If the optical axis of the measurement beam deviates forward in the welding direction from the laser beam, the measurement beam will be emitted not to the deepest portion of the keyhole, but to the curved portion where the penetration is shallower than that of the deepest portion of the keyhole. Therefore, there has been a concern that the depth of the keyhole may be measured to be shallower than the actual deepest portion.

In view of the foregoing background, it is an object of the present invention to more accurately specify the penetration depth of a weld portion.

An aspect of the present disclosure is directed to a laser welding method for welding a weld portion by using a laser beam, and the method has the following solutions.

Specifically, a first aspect of the present disclosure includes: emitting, to the weld portion, the laser beam and a measurement beam coaxially aligned with the laser beam, the measurement beam having a wavelength different from a wavelength of the laser beam; measuring a penetration depth of the weld portion in accordance with the measurement beam reflected on the weld portion during the laser welding; determining an optical axis deviation direction in which an optical axis of the measurement beam deviates from the laser beam, by relatively comparing a plurality of values measured; and in performing the laser welding in the optical axis deviation direction, changing an irradiation position of the measurement beam so that the irradiation position of the measurement beam is moved to a rear side of a center of an optical axis of the laser beam, in a welding direction.

In the first aspect, the optical axis deviation direction is determined by relatively comparing the plurality of values measured. In performing the laser welding in the optical axis deviation direction, the irradiation position of the measurement beam is moved to the rear side of the center of the optical axis of the laser beam, in the welding direction.

These configurations reduce variations of the measured values and allow accurate determination of the penetration depth of the weld portion even when the optical axis of the measurement beam deviates from the laser beam.

Specifically, when the optical axis of the measurement beam deviates to the fore side in the welding direction of the laser beam, the measurement beam is not emitted to the deepest portion of the keyhole of the weld portion, but emitted to a portion shallower than the deepest portion. Therefore, the depth shallower than the actual deepest portion of the keyhole is measured.

To address this, the direction in which the optical axis of the measurement beam deviates from the laser beam is confirmed and when it is determined that the optical axis deviates forward in the welding direction, the irradiation position of the measurement beam is moved during actual laser welding to the rear side of the center of the optical axis of the laser beam.

This configuration, in which the irradiation position of the measurement beam is suitably changed, makes it less likely that a value measured during the laser welding shows a shallower depth than the actual deepest portion of the keyhole.

A second aspect of the present disclosure is an embodiment of the first aspect. In the second aspect, in the measuring of the penetration depth of the weld portion, while performing laser welding, an irradiation position of the laser beam and the irradiation position of the measurement beam are moved in at least a first direction, a second direction opposite to the first direction, a third direction crossing the first direction, or a fourth direction opposite to the third direction.

In the second aspect, to confirm in which direction the optical axis of the measurement beam deviates from the laser beam, laser welding is performed while moving the irradiation positions of the laser beam and the measurement beam in each of the first to fourth directions at the time, for example, of starting the laser welding device.

If it is determined, for example, that the optical axis deviates in the first direction, the irradiation position of the measurement beam is moved to the rear side of the center of the optical axis of the laser beam in the welding direction when the laser welding is performed in the first direction, which is forward in the welding direction, in the actual laser welding work.

A third aspect of the present disclosure is an embodiment of the first aspect. In the third aspect, in the measuring of the penetration depth of the weld portion, laser welding is performed by moving the irradiation position of the measurement beam and an irradiation position of the laser beam in one direction and gyrating the irradiation position of the measurement beam around the center of the optical axis of the laser beam by a predetermined angle at every predetermined traveled distance.

In the third aspect, to confirm in which direction the optical axis of the measurement beam deviates from the laser beam, laser welding is performed while moving the irradiation positions of the laser beam and the measurement beam in one direction at the time, for example, of starting the laser welding device. At this time, the irradiation position of the measurement beam gyrates by a predetermined angle at every predetermined traveled distance. Repetition of the gyratory movement by, for example, 45° or 90° at a time results in the irradiation position of the measurement beam positioned forward in the welding direction at any one of the angles. Therefore, when a depth shallower than the actual deepest portion of the keyhole is measured during the laser welding, the direction at that time is determined to be the optical axis deviation direction.

In performing, thereafter, laser welding in the optical axis deviation direction, the irradiation position of the measurement beam may be moved to the rear side of the center of the optical axis of the laser beam in the welding direction.

A fourth aspect of the present disclosure is an embodiment of any one of the first to third aspects. In the fourth aspect, in the determining of the optical axis deviation direction, the plurality of values measured are compared with a predetermined reference value, and a direction in which a value smaller than the reference value is measured is determined to be the optical axis deviation direction.

In the fourth aspect, a direction in which a value smaller than the predetermined reference value is measured is determined to be the optical axis deviation direction.

A fifth aspect of the present disclosure is an embodiment of any one of the first to third aspects. In the fifth aspect, in the determining of the optical axis deviation direction, a direction in which a value smallest among the plurality of values measured is measured is determined to be the optical axis deviation direction.

In the fifth aspect, a direction in which the value smallest is measured is determined to be the optical axis deviation direction.

The above aspects of the present disclosure enable accurate specification of the penetration depth of a weld portion.

DETAILED DESCRIPTION

Embodiments of the present invention will be described in detail with reference to the drawings. Note that the following description of embodiments is merely an example in nature, and is not intended to limit the scope, applications, or use of the present invention.

Figure 1:
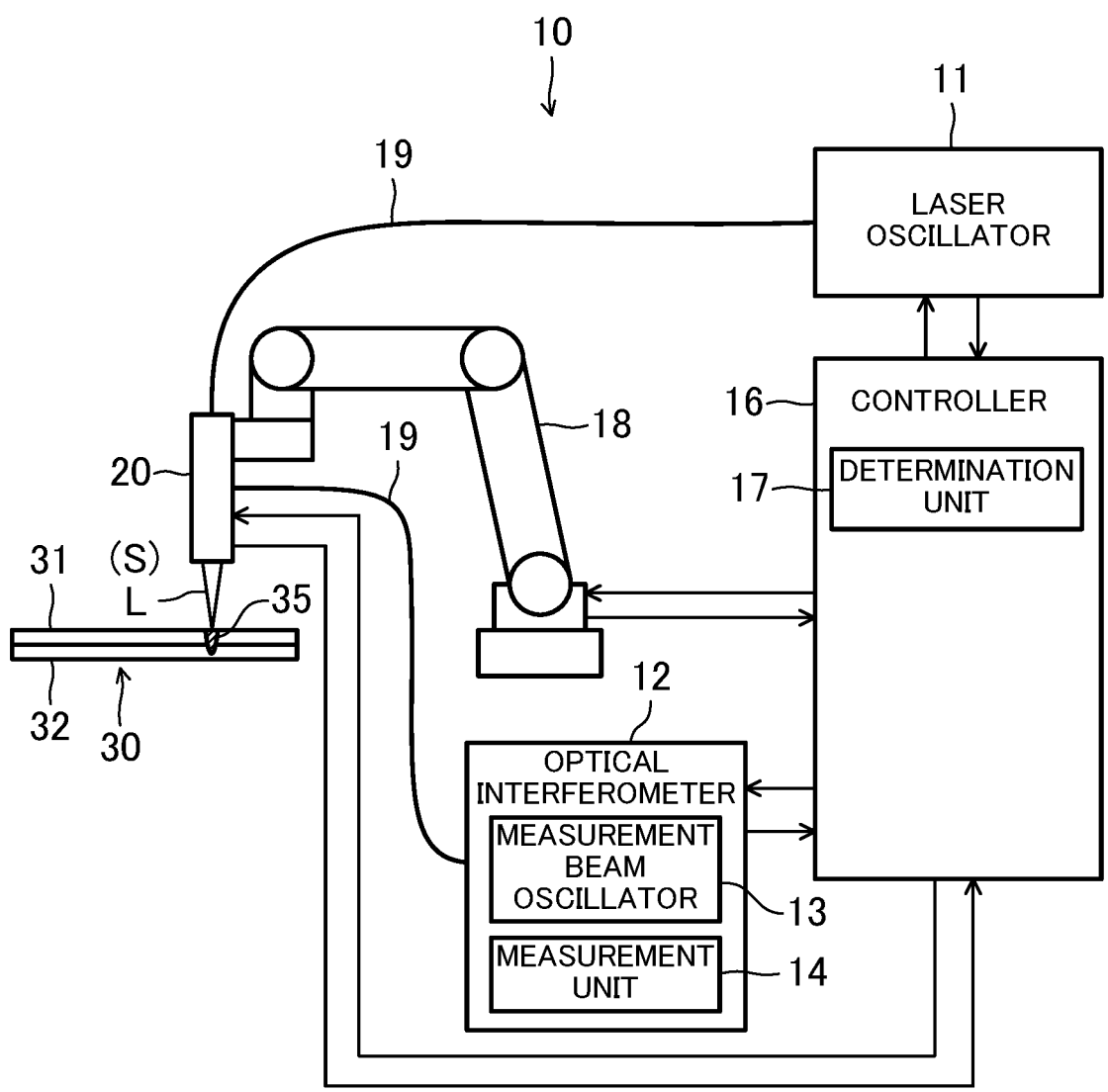
FIG. 1 is a schematic view of a laser welding device in accordance with an embodiment.

As illustrated in FIG. 1, a laser welding device 10 includes a laser oscillator 11 configured to output a laser beam L, an optical interferometer 12 configured to output a measurement beam S, a laser emitting head 20 (irradiation unit) configured to emit the laser beam L and the measurement beam S to a welding target 30, a robot 18 to which the laser emitting head 20 is attached and which is configured to carry the laser emitting head 20, and a controller 16 configured to control the operations of the laser emitting head 20 and the robot 18 to perform laser welding.

The laser oscillator 11 outputs the laser beam L based on an instruction from the controller 16. The laser oscillator 11 and the laser emitting head 20 are connected via an optical fiber 19. The laser beam L is transmitted from the laser oscillator 11 to the laser emitting head 20 through the optical fiber 19.

The optical interferometer 12 includes a measurement beam oscillator 13 configured to output the measurement beam S having a wavelength different from the wavelength of the laser beam L and a measurement unit 14 configured to measure the depth of penetration of a weld portion 35 to be described later. The measurement beam oscillator 13 outputs the measurement beam S based on an instruction from the controller 16. The optical interferometer 12 and the laser emitting head 20 are connected via an optical fiber 19. The measurement beam S is transmitted from the optical interferometer 12 to the laser emitting head 20 via the optical fiber 19.

The laser emitting head 20 is attached to a distal end of an arm of the robot 18. The laser emitting head 20 focuses the laser beam L and the measurement beam S on the welding target 30 based on an instruction from the controller 16.

The robot 18 moves the laser emitting head 20 based on an instruction from the controller 16 to a position as instructed, at which the laser beam L and the measurement beam S are emitted for scanning.

The controller 16 is connected to the laser oscillator 11, the optical interferometer 12, and the robot 18. The controller 16 has a function of controlling the travel speed of the laser emitting head 20 and has functions of controlling when to start or stop the output of the laser beam L and controlling an output intensity of the laser beam L. As will be described in detail later, the controller 16 has a determination unit 17 that determines the penetration depth of the weld portion 35 in accordance with a plurality of measured values obtained by the measurement unit 14.

The welding target 30 includes an upper metal plate 31 and a lower metal plate 32 that are overlapping in the vertical direction. The laser welding device 10 welds the upper metal plate 31 and the lower metal plate 32 by emitting the laser beam L to the upper surface of the upper metal plate 31.

The laser welding device 10 according to the present embodiment can measure the depth of penetration of the weld portion 35 while performing laser welding.

Figure 2:
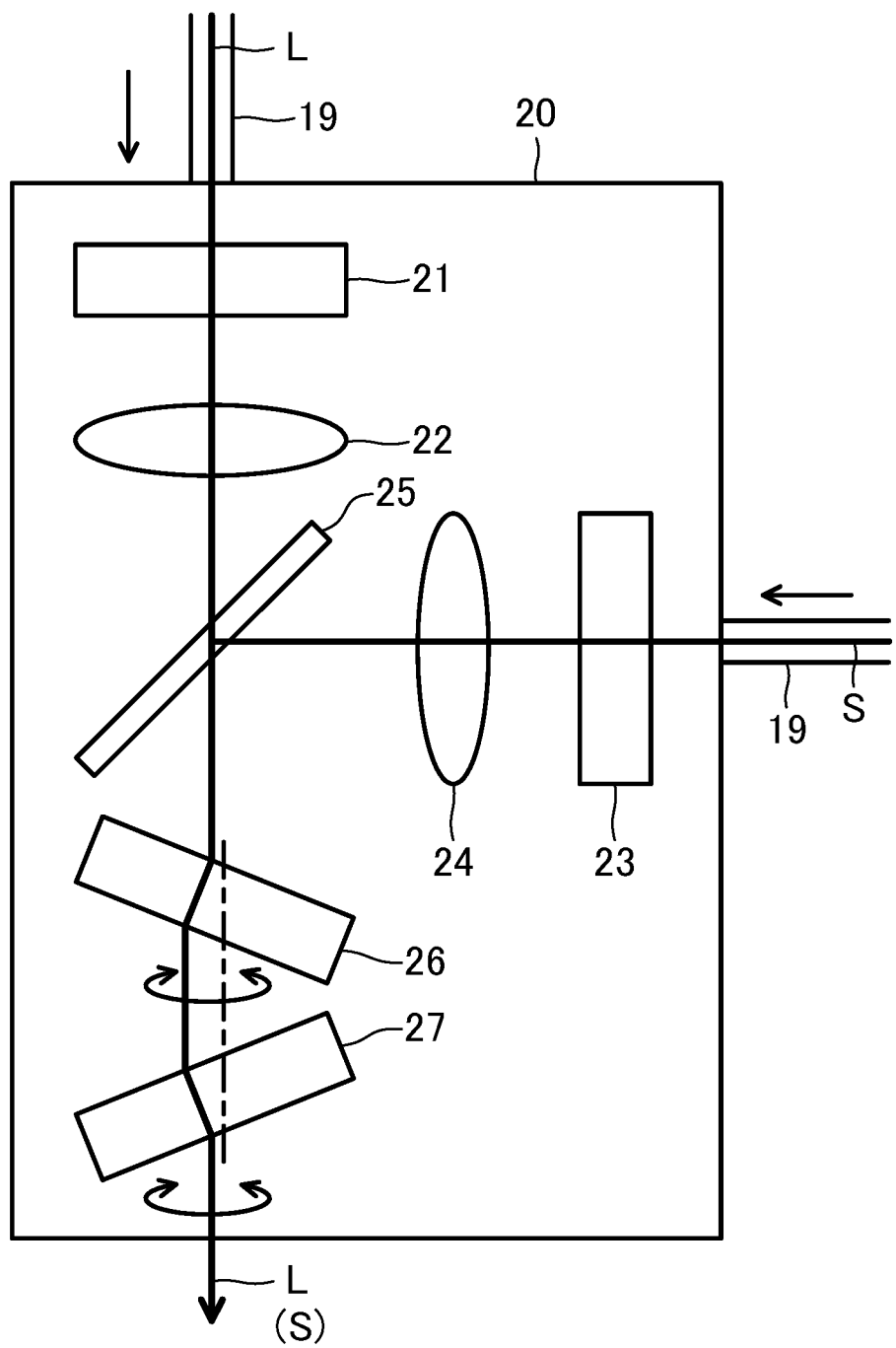
FIG. 2 is a schematic view illustrating a configuration of a laser emitting head.

Specifically, as illustrated in FIG. 2, the laser emitting head 20 includes: a first collimating lens 21 and a first focus lens 22 through which the laser beam L passes; a second collimating lens 23 and a second focus lens 24 through which the measurement beam S passes; a beam splitter 25 that combines the laser beam L and the measurement beam S into a coaxial light beam; a first parallel plate 26; and a second parallel plate 27.

The beam splitter 25 is a dichroic mirror configured to transmit or reflect a beam having a predetermined wavelength and is configured to transmit the laser beam L from the laser oscillator 11 and reflect the measurement beam S from the optical interferometer 12.

In one preferred embodiment, the difference between the wavelength of the laser beam L and the wavelength of the measurement beam S is 100 nm or more to sufficiently separate the laser beam L from the measurement beam S with the beam splitter 25.

The first parallel plate 26 and the second parallel plate 27 are connected to a motor (not shown), and are rotated in accordance with an instruction from the controller 16.

The laser beam L output from the laser oscillator 11 passes through the optical fiber 19 to the laser emitting head 20. The laser beam L having entered the laser emitting head 20 is collimated by the first collimating lens 21 and focused by the first focus lens 22. The laser beam L focused by the first focus lens 22 passes through the beam splitter 25.

Meanwhile, the measurement beam S output from the optical interferometer 12 passes through the optical fiber 19 to the laser emitting head 20. The measurement beam S having entered the laser emitting head 20 is collimated by the second collimating lens 23 and focused by the second focus lens 24. The measurement beam S is then concentrically and coaxially aligned with the laser beam L by the beam splitter 25.

Note that the second focus lens 24 also has a function of causing the measurement beam S reflected on the weld portion 35 to enter the optical interferometer 12 again, via the beam splitter 25.

The laser beam L and the measurement beam S coaxially aligned with each other pass through the first parallel plate 26 and the second parallel plate 27 controlled by the controller 16, at which the irradiation position (focal length) of the laser beam L and the measurement beam S is determined, and the laser beam L and the measurement beam are emitted to the weld portion 35 of the welding target 30.

In this case, in the laser emitting head 20, the first parallel plate 26 and the second parallel plate 27 are rotated to rotate the laser beam L and the measurement beam S along circular trajectories, whereby the laser beam L and the measurement beam S can gyrate. That is, the first parallel plate 26 and the second parallel plate 27 serve as an irradiation position changer that is capable of changing the irradiation positions of the laser beam L and the measurement beam S.

Since the robot 18 moves the laser emitting head 20, the irradiation position of the laser beam L and the measurement beam S can be moved in a welding region on the welding target 30.

Figure 3:
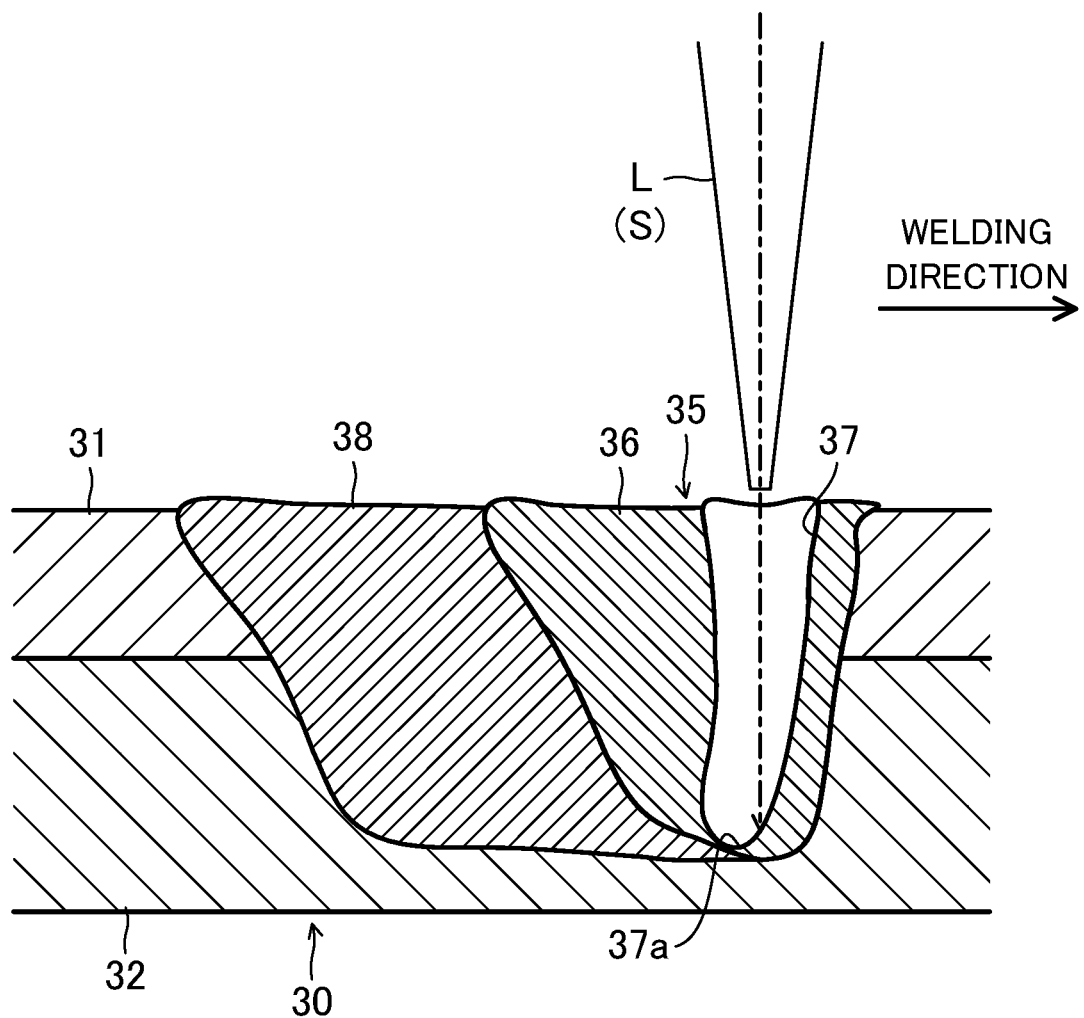
FIG. 3 is a side cross-sectional view illustrating a positional relation among the laser beam, the measurement beam, and a keyhole.

As illustrated in FIG. 3, in welding the weld portion 35 of the welding target 30 including the upper metal plate 31 and the lower metal plate 32, the laser welding device 10 emits the laser beam L to the upper surface of the upper metal plate 31 from above the welding target 30.

The weld portion 35 irradiated with the laser beam L is melted from an upper portion, and a weld puddle 36 is formed in the weld portion 35. When the weld portion 35 is melted, molten metal in the weld puddle 36 vaporizes and the vaporizing metal generates vapor pressure to form a keyhole 37. In this example, the weld portion 35 includes both weld puddle 36 and keyhole 37. A solidified portion 38 is formed behind the weld puddle 36 in the welding direction when the weld puddle 36 is solidified.

The measurement beam S output from the optical interferometer 12 is concentrically and coaxially aligned, by the beam splitter 25, with the laser beam L output from the laser oscillator 11, and then emitted into the keyhole 37. The emitted measurement beam S is reflected from a bottom 37a of the keyhole 37 and enters the optical interferometer 12 via the beam splitter 25.

The optical path length of the measurement beam S entering the optical interferometer 12 is measured by the measurement unit 14. The measurement unit 14 determines the depth of the keyhole 37 from the optical path length measured, as the penetration depth of the weld portion 35. The laser welding device 10 determines the quality of the weld portion 35 based on the determined depth of penetration.

With the above-described configuration, the laser welding device 10 can measure the depth of penetration while performing the laser welding.

However, for example, the beam splitter 25 may be warped due to the heat, thus causing misalignment of optical axes of the laser beam L and the measurement beam S. When such a misalignment of optical axes of the laser beam L and the measurement beam S occurs, the optical interferometer 12 may determine the depth of the keyhole 37 to be shallower than the actual depth and may fail to accurately measure the penetration depth.

Specifically, the keyhole 37 is formed by a vapor pressure generated when the metal in the weld portion 35 melts and evaporates. The shape of the formed keyhole 37 varies depending on the period of irradiation with the laser beam L and the state of the weld puddle 36.

The faster the moving speed (welding speed) of the laser emitting head 20 becomes, the more rearward the interior wall of the keyhole 37 on the fore side in the welding direction tends to curve. Therefore, in one preferred embodiment, the laser welding speed is suitably set to reduce the curvature of the curved portion of the bottom 37a of the keyhole 37.

However, despite a suitable setting of the laser welding speed, it is difficult to make the opening diameter of the keyhole 37 and the hole diameter of the bottom 37a substantially equal to each other, and the interior wall of the keyhole 37 on the fore side in the welding direction may have a curved portion where the penetration is shallow.

Figure 4:
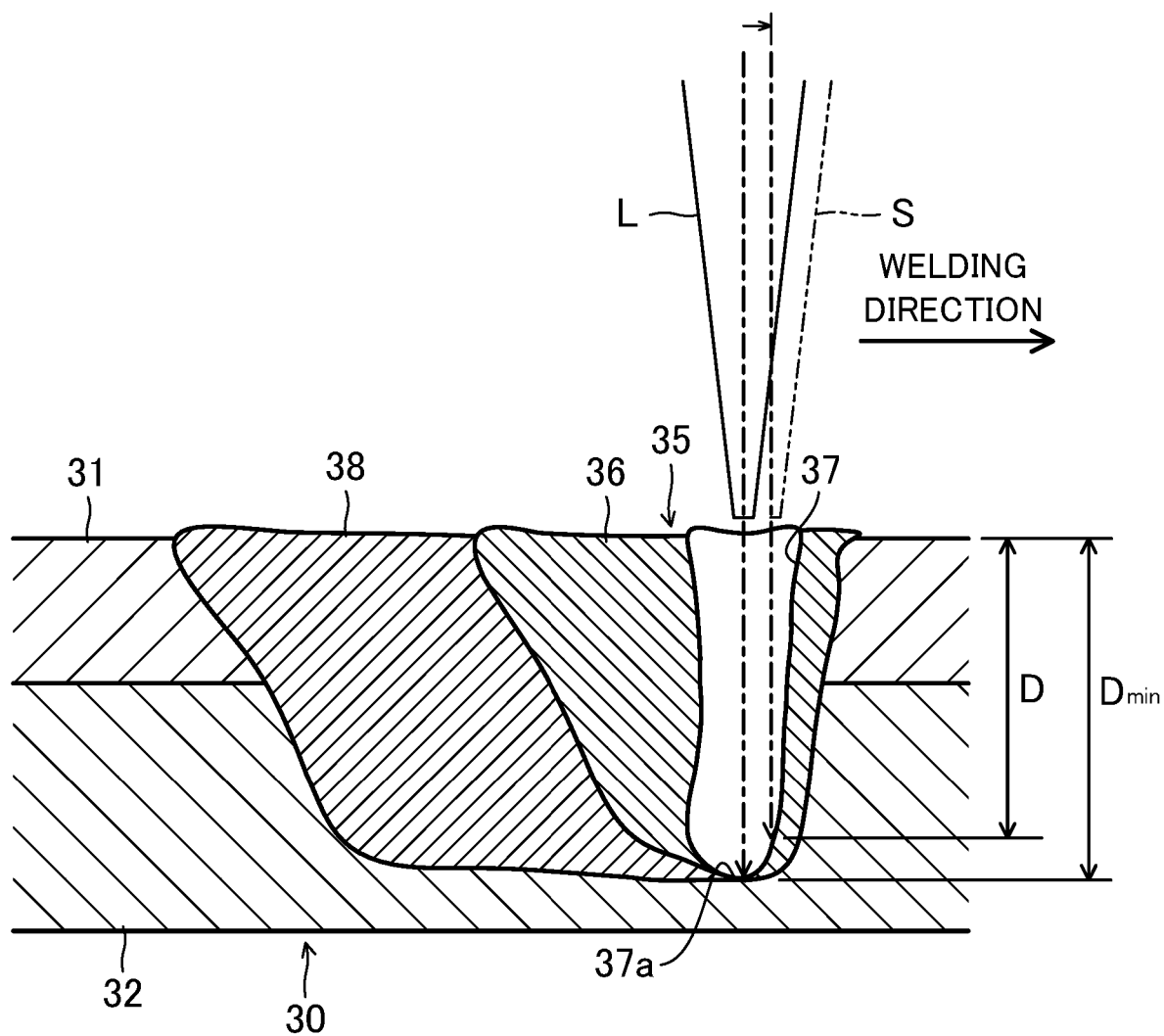
FIG. 4 is a side cross-sectional view illustrating a positional relation among the laser beam, the measurement beam, and a keyhole, when a deviation of an optical axis of the measurement beam occurs.

Thus, if the optical axis of the measurement beam S deviates forward in the welding direction from the laser beam L, as indicated by imaginary lines in FIG. 4, the position of the bottom 37a of the keyhole 37 and the center position of the spot of the measurement beam S do not coincide with each other, which may result in that the measurement beam S is not emitted to the bottom 37a.

In a state where the measurement beam S is not emitted to the bottom 37a (e.g., in a state where the optical axis of the measurement beam S deviates forward in the welding direction from the laser beam L, and the measurement beam S is emitted to the fore side interior wall of the keyhole 37), the optical interferometer 12 measures, as the position of the bottom 37a, the position where the measurement beam S is reflected and determines the measured depth as the depth of the keyhole 37.

That is, if the measurement beam S is not emitted to the bottom 37a, the optical interferometer 12 determines the depth of the keyhole 37 to be shallower than the actual depth. In the example shown in FIG. 4, the depth D that is shallower than the actual depth Dmin of the keyhole 37 is measured. The weld portion 35 cannot be accurately inspected if the depth of the keyhole 37 is determined to be shallower than the actual depth.

The following describes how the penetration depth of the weld portion 35 varies, i.e., how the measured depth of the keyhole 37 varies, between the states where there is misalignment of the optical axes and there is not.

In the example shown in FIG. 4, the thickness of the upper metal plate 31 is 1 mm; the thickness of the lower metal plate 32 is 4.3 mm; and the optical axis of the measurement beam S is deviated 100 μm forward in the welding direction from the optical axis of the laser beam L.

Figure 5:
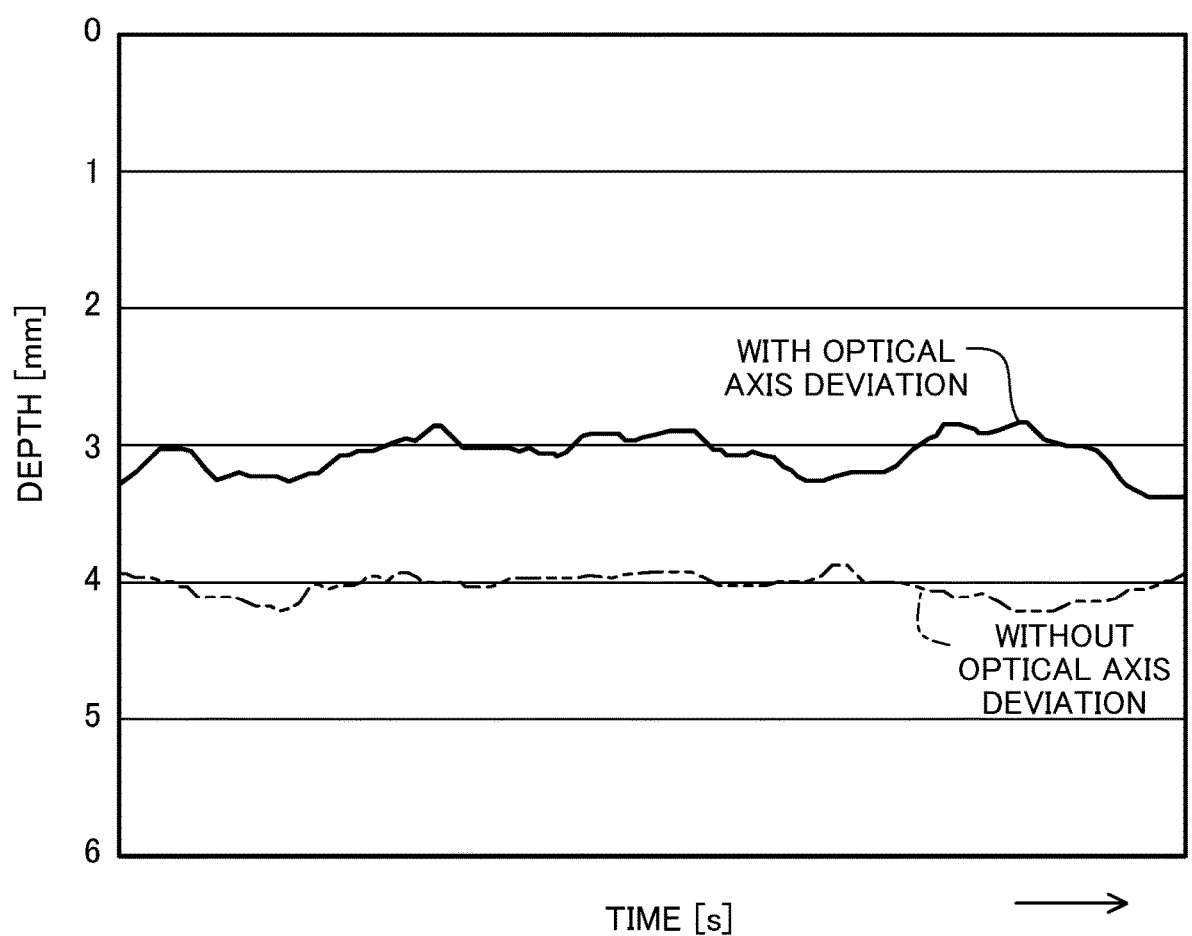
FIG. 5 is a graph comparing a penetration depth measured when the deviation in the optical axis does not occur, with a penetration depth measured when the deviation in the optical axis occurs.

FIG. 5 is a graph illustrating the resulting depth of the keyhole 37, which is the penetration depth of the weld portion 35 from the surface of the welding target 30 or from an imaginary surface serving as the reference. As illustrated in FIG. 5, when the penetration depth is measured while the irradiation positions are moved in a direction in which the optical axis of the measurement beam S deviates, the measured values of the depth of the keyhole 37 are around 3 mm. On the other hand, when the optical axes are not misaligned, the measured values of the depth of the keyhole 37 are around 4 mm.

Note that the measured values become small (shallow) when the optical axis of the measurement beam S deviates forward in the welding direction from the laser beam L. Therefore, when the optical axis of the measurement beam S deviates rearward, or to the right or left in relation to the welding direction from the laser beam L, then the measured values of the depth of the keyhole 37 will be around 4 mm.

In view of this, in the present embodiment, to confirm in which direction the optical axis of the measurement beam S deviates from the laser beam L, laser welding is performed while moving the irradiation positions of the laser beam L and the measurement beam S forward, rearward, leftward, and rightward at the time, for example, of starting the laser welding device 10.

Figure 6:
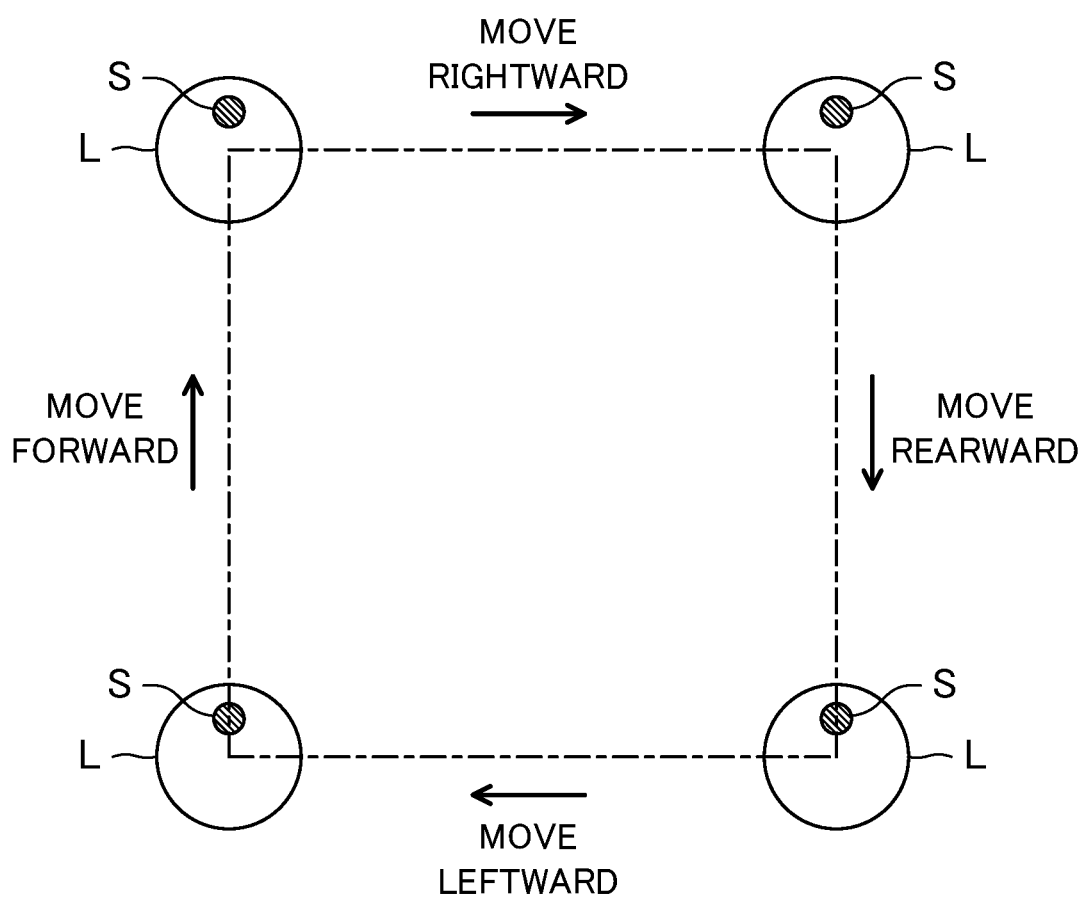
FIG. 6 is a diagram illustrating a positional relation between a direction in which the optical axis of the measurement beam deviates from the laser beam and the forward, rearward, leftward and rightward directions in which the laser beam and the measurement beam are moved.

As illustrated in FIG. 6, the laser welding device 10 welds the welding target 30 by emitting the laser beam L and the measurement beam S to the welding target 30 while moving the irradiation positions of the laser beam L and the measurement beam S in four directions, i.e., first to fourth directions. In the following description, the first direction is a forward direction; a second direction is the rearward direction; a third direction is a leftward direction, and the fourth direction is a rightward direction. In the example illustrated in FIG. 6, the optical axis of the measurement beam S deviates 100 μm forward from the laser beam L.

The laser welding device 10 performs laser welding along a rectangular welding path formed by a center line as illustrated in FIG. 6. Specifically, from the lower left corner position of FIG. 6 as the starting point, laser welding is performed while moving the laser beam L and the measurement beam S forward. After the beams reach the upper left corner of FIG. 6, the laser welding is performed while moving the laser beam L and the measurement beam S rightward, backward, and leftward in a similar manner.

In this manner, the irradiation positions of the laser beam L and the measurement beam S are moved in four directions, i.e., the forward, rearward, leftward and rightward directions, to perform the laser welding, and the penetration depth of the weld portion 35 is measured during the laser welding in each of the directions.

Then, the determination unit 17 determines a deviation direction of the optical axis of the measurement beam S by comparing a plurality of measured values obtained during the laser welding with a predetermined reference value. The predetermined reference value is, for example, a value indicating a penetration depth determined in advance according to the output of the laser beam L and the welding speed. In other words, the predetermined reference value is a value of a depth of the keyhole 37, which is the penetration depth determined in advance according to the output of the laser beam L and the welding speed through an experiment or the like. The predetermined reference value is stored in the determination unit 17 as a table.

Since the depth of the deepest portion of the keyhole 37 is 4 mm in the present embodiment, the reference value may be set to 4 mm or, for example, approximately 3.8 mm in consideration of variations in the measured values.

In the example illustrated in FIG. 6, when the laser welding is performed while moving the laser beam L and the measurement beam S forward, the measured value is around 3 mm and smaller than the reference value. On the other hand, when the laser welding is performed while moving the laser beam L and the measurement beam S rightward, rearward, and leftward, the measured value is around 4 mm and is therefore not smaller than the reference value.

Thus, even if the deviation direction of the optical axis of the measurement beam S from the laser beam L is unknown at a time of, for example, starting the laser welding device 10, it is possible to determine, by comparing the plurality of measured values with the reference value, that a direction in which a value smaller than the reference value is measured is the optical axis deviation direction in which the optical axis of the measurement beam S deviates from the laser beam L.

Then, when the laser welding is actually started after determining the optical axis deviation direction, the laser emitting head 20 is rotated to adjust the irradiation position of the measurement beam S.

Figure 7:
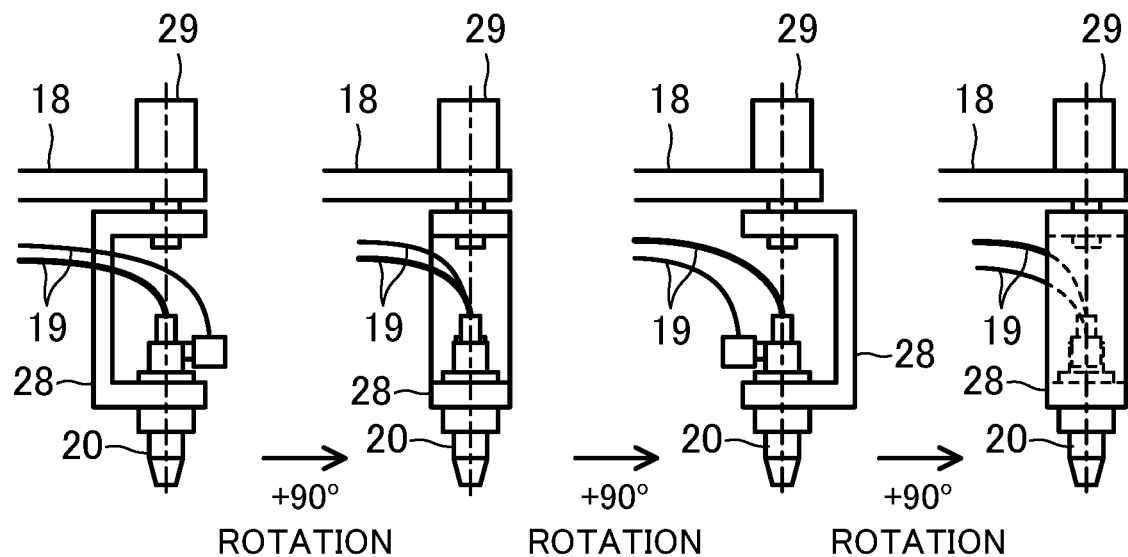
FIG. 7 is a diagram explaining a rotational motion of a laser emitting head.

Specifically, as illustrated in FIG. 7, the laser emitting head 20 is rotatably attached to the arm of the robot 18 via a bracket 28. To the arm of the robot 18, a drive motor 29 is attached.

To a lower portion of the bracket 28, the laser emitting head 20 is attached. To an upper portion of the bracket 28, a rotation shaft of the drive motor 29 is attached. The rotation shaft of the drive motor 29 is arranged so as to be coaxial with the optical axis of the laser emitting head 20.

Figure 8:
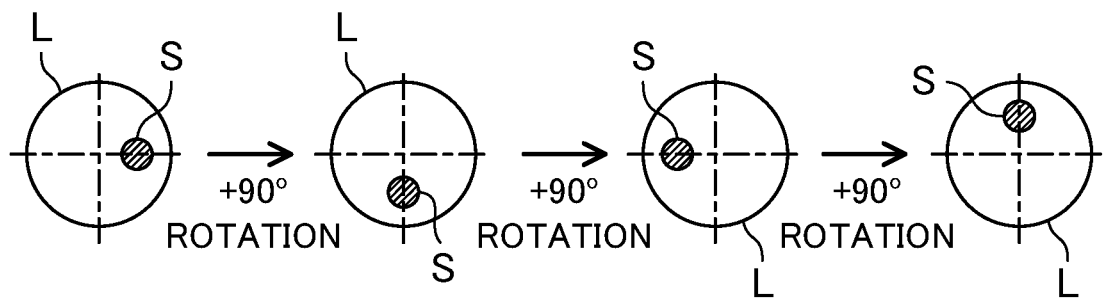
FIG. 8 is a diagram illustrating a change in the irradiation position of the measurement beam in association with the rotation of the laser emitting head.

Therefore, rotating the drive motor 29 causes the laser emitting head 20 to rotate via the bracket 28. In the example shown in FIG. 7, the laser emitting head 20 is rotated clockwise by 90° at a time. At this time, as illustrated in FIG. 8, the irradiation position of the measurement beam S gyrates clockwise about the optical axis of the laser beam L by 90° at a time.

Figure 9:
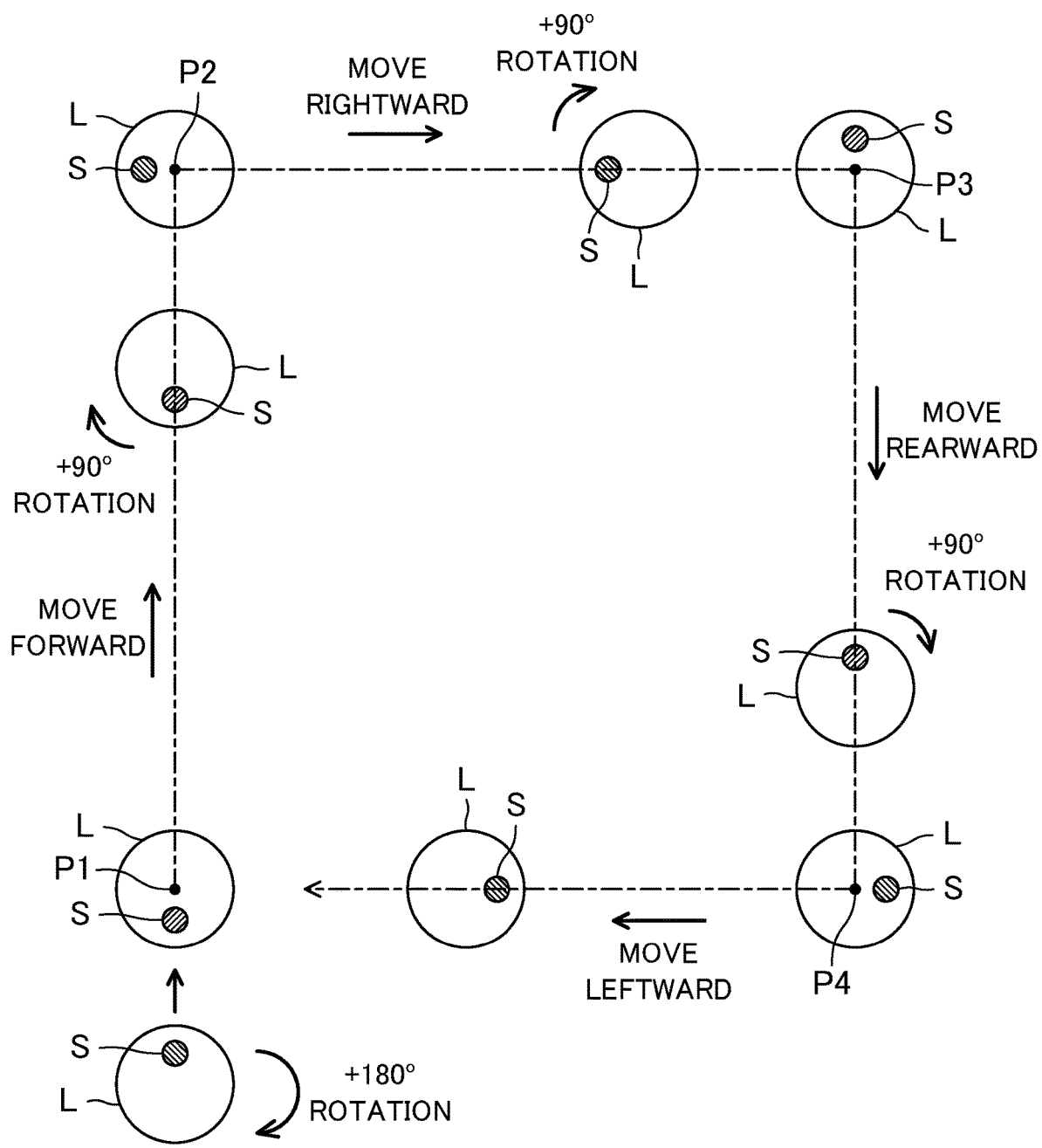
FIG. 9 is a diagram illustrating a state in which an optical axis deviation direction of the measurement beam is changed during laser welding.

The following describes a case of actually performing laser welding along a rectangular welding path formed by a center line as illustrated in FIG. 9. In the example illustrated in FIG. 9, the irradiation position (the optical axis) of the measurement beam S deviates forward in the welding direction at a position before a lower left corner position P1.

Therefore, prior to laser welding while moving the laser beam L and the measurement beam S forward from the lower left corner position P1 to an upper left corner position P2, the laser emitting head 20 is rotated clockwise by 180°, thereby moving the irradiation position of the measurement beam S to the rear side in the welding direction (to the rear side of the center of the optical axis of the laser beam L in FIG. 9). Then, the laser beam L and the measurement beam S are moved forward to perform the laser welding.

Next, prior to laser welding while moving the laser beam L and the measurement beam S rightward from the upper left corner position P2 to an upper right corner position P3, the laser emitting head 20 is rotated clockwise by 90°. Specifically, immediately before the beams reach the upper left corner position P2, the laser emitting head 20 is rotated clockwise by 90°. In this manner, the irradiation position of the measurement beam S is moved to the rear side in the welding direction (to the left of the center of the optical axis of the laser beam L in FIG. 9). Then, the laser beam L and the measurement beam S are moved rightward to perform the laser welding.

Next, prior to laser welding while moving the laser beam L and the measurement beam S rearward from the upper right corner position P3 to an lower right corner position P4, the laser emitting head 20 is rotated clockwise by 90°. Specifically, immediately before the beams reach the upper right corner position P3, the laser emitting head 20 is rotated clockwise by 90°. In this manner, the irradiation position of the measurement beam S is moved to the rear side in the welding direction (to the fore side of the center of the optical axis of the laser beam L in FIG. 9). Then, the laser beam L and the measurement beam S are moved rearward to perform the laser welding.

Next, prior to laser welding while moving the laser beam L and the measurement beam S leftward from the lower right corner position P4 to the lower left corner position P1, the laser emitting head 20 is rotated clockwise by 90°. Specifically, immediately before the beams reach the lower right corner position P4, the laser emitting head 20 is rotated clockwise by 90°. In this manner, the irradiation position of the measurement beam S is moved to the rear side in the welding direction (to the right of the center of the optical axis of the laser beam L in FIG. 9). Then, the laser beam L and the measurement beam S are moved leftward to perform the laser welding.

In this manner, the irradiation position of the measurement beam S is positioned on the rear side in the welding direction, while the laser welding is performed in any of the forward, rightward, rearward, and leftward directions.

Figure 10:
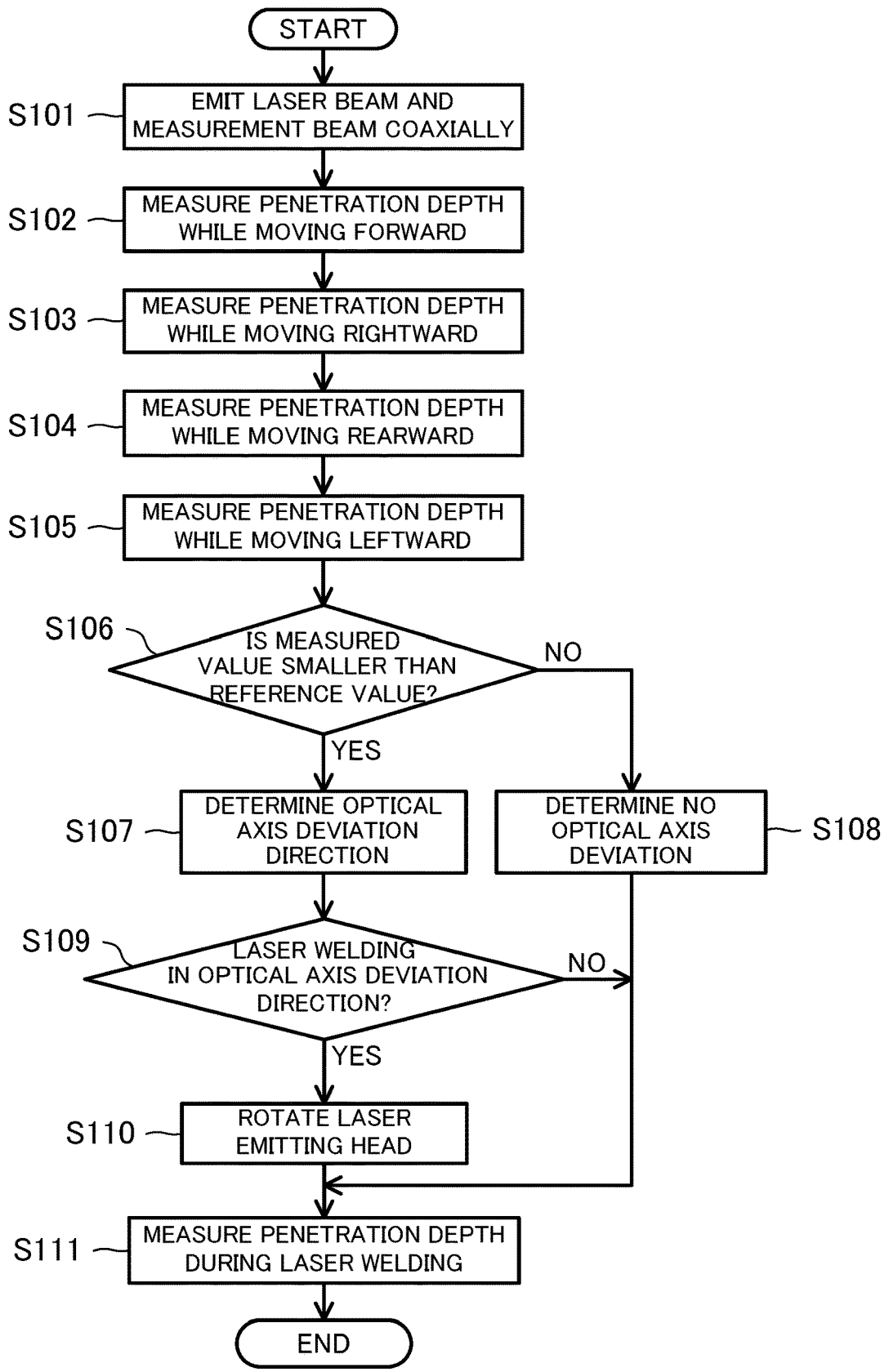
FIG. 10 is a flowchart illustrating a process of measuring the penetration depth of a weld portion.

The following describes a process of measuring the penetration depth of the weld portion 35 with reference to the flowchart of FIG. 10. As illustrated in FIG. 10, at Step S101, the laser beam L and the measurement beam S are coaxially aligned with each other in the laser emitting head 20, and the laser emitting head 20 emits the coaxially aligned beams to the weld portion 35. The process proceeds to Step S102.

In step S102, while the irradiation positions of the laser beam L and the measurement beam S are moved forward, the penetration depth of the weld portion 35 is measured in accordance with the measurement beam S reflected on the weld portion 35. The process proceeds to step S103.

In step S103, while the irradiation positions of the laser beam L and the measurement beam S are moved rightward, the penetration depth of the weld portion 35 is measured in accordance with the measurement beam S reflected on the weld portion 35. The process proceeds to step S104.

In step S104, while the irradiation positions of the laser beam L and the measurement beam S are moved rearward, the penetration depth of the weld portion 35 is measured in accordance with the measurement beam S reflected on the weld portion 35. The process proceeds to step S105.

In step S105, while the irradiation positions of the laser beam L and the measurement beam S are moved leftward, the penetration depth of the weld portion 35 is measured in accordance with the measurement beam S reflected on the weld portion 35. The process proceeds to step S106.

In step S106, the determination unit 17 determines whether the plurality of measured values obtained while the irradiation positions are moved forward, rearward, leftward, and rightward are smaller than a predetermined reference value. If it is YES in step S106, the process proceeds to step S107 If it is NO in step S106, the process proceeds to step S108.

In step S107, a direction in which a value smaller than the reference value is measured is determined to be the optical axis deviation direction in which the optical axis of the measurement beam S deviates from the laser beam L. The process proceeds to step S109.

In step S108, it is determined that there is no deviation in the optical axis, and the process proceeds to step S111.

In step S109, whether to perform laser welding in the optical axis deviation direction is determined. If it is YES at step S109, the process proceeds to step S110. If it is NO at step S109, the process proceeds to step S111.

In step S110, the laser emitting head 20 is rotated to move the irradiation position of the measurement beam S to the rear side of the center of the optical axis of the laser beam L in the welding direction, and the process proceeds to step S111.

In step S111, the penetration depth of the weld portion 35 of the welding target 30 is measured while performing laser welding to the weld portion 35. Then, the process is ended.

In this manner, variation of the measured values can be reduced even if the optical axis of the measurement beam S deviates from the laser beam L, which allows accurate determination of the penetration depth of the weld portion 35.

Other Embodiments

The embodiments described above may be modified as follows.

In the present embodiment, in order to determine the optical axis deviation direction, laser welding is performed while the irradiation positions of the laser beam L and the measurement beam S are moved along a rectangular welding path. However, this is a non-limiting example. For example, the irradiation positions may be moved along a welding path of a circular shape or other polygonal shapes. Further, instead of continuously moving the irradiation positions forward, rearward, leftward, and rightward, the irradiation positions may be moved discontinuously. For example, the irradiation positions may be moved in a first direction, and then moved to somewhere else before moving in a second direction or a third direction. Further, the moving direction of the irradiation positions of the laser beam L and the measurement beam S may be clockwise or counterclockwise.

Figure 11:
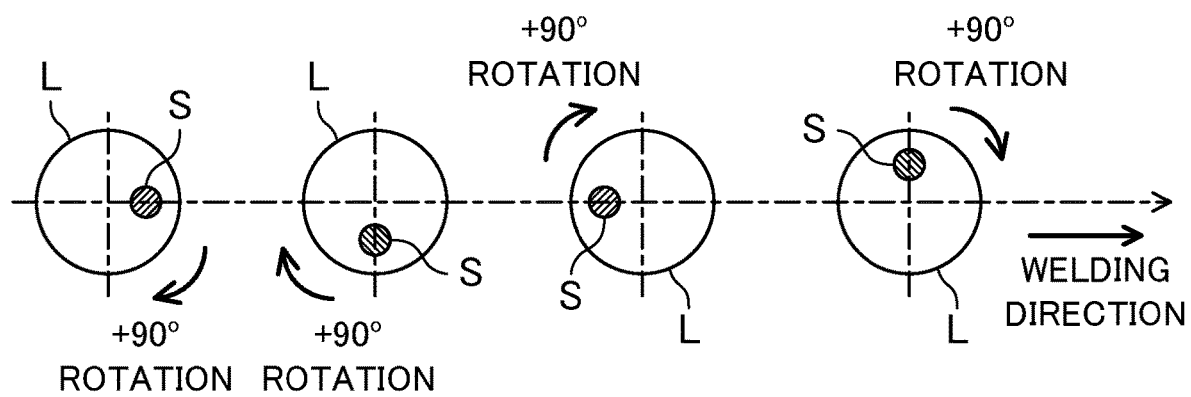
FIG. 11 is a diagram illustrating steps for specifying an optical axis deviation direction of the measurement beam in accordance with another embodiment.

Further, as shown in FIG. 11, the optical axis deviation direction may be determined by rotating the laser emitting head 20 in the course of moving the irradiation positions of the laser beam L and the measurement beam S in one direction (rightward in the example of FIG. 11).

Specifically, in FIG. 11, laser welding is performed by moving the irradiation positions of the measurement beam S and the laser beam L rightward and gyrating the irradiation position of the measurement beam S clockwise by 90° around the center of the optical axis of the laser beam L at every predetermined traveled distance. At any one of the rotation angles, the irradiation position of the measurement beam S is positioned forward in the welding direction (at the left end in the example of FIG. 11).

Therefore, when a depth shallower than the actual deepest portion of the keyhole 37 is measured during the laser welding, the direction at that time is determined to be the optical axis deviation direction. In the example of FIG. 11, the laser emitting head 20 is rotated by 90° at a time. However, the angle may be any other angle (e.g., 45°).

Further, in the present embodiment, a plurality of measured values are compared with a predetermined reference value, and a direction in which a value smaller than the reference value is measured is determined to be the optical axis deviation direction. However, this is a non-limiting example. For example, a direction in which the value smallest (shallowest depth) among the plurality of measured values is measured may be determined to be the optical axis deviation direction.

As can be seen from the foregoing description, the present invention allows accurate determination of the penetration depth of a weld portion, which is very practical and useful and therefore highly applicable in the industry.

What is claimed is:

1. A laser welding method for welding a weld portion by using a laser beam emitted from a laser emitting head, the method comprising:
    emitting, to the weld portion, the laser beam and a measurement beam, an optical axis of the measurement beam being coaxially aligned with the laser beam, the measurement beam having a wavelength different from a wavelength of the laser beam;
    measuring a penetration depth of the weld portion in accordance with the measurement beam reflected on the weld portion during the laser welding;
    when a misalignment of the optical axis of the measurement beam occurs, determining an optical axis deviation direction in which an optical axis of the measurement beam deviates from the laser beam due to the misalignment, by relatively comparing a plurality of values measured; and
    when performing the laser welding in the optical axis deviation direction, rotating the laser emitting head, thereby changing an irradiation position of the measurement beam so that the irradiation position of the measurement beam is moved to a rear side of a center of an optical axis of the laser beam, in a welding direction.

2. The laser welding method of claim 1, wherein
in the measuring of the penetration depth of the weld portion, while performing laser welding, an irradiation position of the laser beam and the irradiation position of the measurement beam are moved in at least a first direction, a second direction opposite to the first direction, a third direction crossing the first direction, or a fourth direction opposite to the third direction.

3. The laser welding method of claim 1, wherein
in the measuring of the penetration depth of the weld portion, laser welding is performed, by rotating the laser emitting head and thereby moving the irradiation position of the measurement beam and an irradiation position of the laser beam in one direction and gyrating the irradiation position of the measurement beam around the center of the optical axis of the laser beam by a predetermined angle at every predetermined traveled distance.

4. The laser welding method of claim 1, wherein
in the determining of the optical axis deviation direction, the plurality of values measured are compared with a predetermined reference value, and a direction in which a value smaller than the reference value is measured is determined to be the optical axis deviation direction.

5. The laser welding method of claim 1, wherein
in the determining of the optical axis deviation direction, a direction in which a value smallest among the plurality of values measured is determined to be the optical axis deviation direction.

* * * * *